(12) United States Patent
Prathipati et al.

(10) Patent No.: US 12,304,639 B2
(45) Date of Patent: May 20, 2025

(54) CONTIGUOUS PASSENGER SEAT ROWS CONFIGURED TO FORM A BED

(71) Applicant: B/E Aerospace, Inc., Winston-Salem, NC (US)

(72) Inventors: Krishna Chaitanya Prathipati, Hyderabad (IN); Ravindra Ramulu Kandukuri, Secunderabad (IN); Aditya Sharma, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/379,562

(22) Filed: Oct. 12, 2023

(65) Prior Publication Data
US 2025/0074598 A1 Mar. 6, 2025

(51) Int. Cl.
*B64D 11/06* (2006.01)

(52) U.S. Cl.
CPC ...... *B64D 11/0641* (2014.12); *B64D 11/0638* (2014.12); *B64D 11/0647* (2014.12)

(58) Field of Classification Search
CPC . B60N 2/32; B60N 2/34; B60N 2/345; B60N 3/008; B64D 11/06; B64D 11/0604; B64D 11/0638; B64D 11/0639; B64D 11/06395; B64D 11/064; B64D 11/0641; B64D 11/0647; B64D 2011/0069
USPC ...................................................... 244/118.5
See application file for complete search history.

(56) References Cited

U.S. PATENT DOCUMENTS

| | | | | |
|---|---|---|---|---|
| 1,378,615 | A * | 5/1921 | Rehanek | B60N 2/34 5/118 |
| 1,401,177 | A * | 12/1921 | Mitchell | B60N 2/34 297/352 |
| 1,548,334 | A * | 8/1925 | Sebell | B60N 2/34 297/65 |
| 2,796,111 | A * | 6/1957 | Janczyszyn | B60N 2/34 5/118 |
| 2,947,349 | A * | 8/1960 | Kryter | B64D 11/0601 296/64 |
| 3,983,729 | A | 10/1976 | Traczyk et al. | |
| 6,663,173 | B1 | 12/2003 | Corfitsen | |

(Continued)

FOREIGN PATENT DOCUMENTS

| | | |
|---|---|---|
| EP | 3118116 A1 | 1/2017 |
| EP | 3812274 A1 | 4/2021 |

OTHER PUBLICATIONS

European Search Report received in EP Application No. 24192459. 6, Dec. 23, 2025, 10 pages.

*Primary Examiner* — Joshua E Rodden
(74) *Attorney, Agent, or Firm* — Suiter Swantz IP (57) ABSTRACT

A passenger seating arrangement including contiguous rows configured to form a bed. Each passenger seat in the first row includes a deployable bed extension. In use, each deployed bed extension resides in a plane of a seat pan in an aft positioned row. At least one support deploys relative to its respective seat pan to support the deployed bed extension, for instance from below. In embodiments, a bifold cushion carried on the seat pan in the aft row unfolds to be positioned atop the deployed bed extension to form a bed. In embodiments, each of the contiguous rows includes at least three seats, wherein each seat is independently configured to form a portion of the bed.

15 Claims, 9 Drawing Sheets

(56) References Cited

U.S. PATENT DOCUMENTS

| | | | |
|---|---|---|---|
| 6,715,716 B1* | 4/2004 | Cheung | B64D 11/0643 |
| | | | 244/122 R |
| 7,070,149 B2* | 7/2006 | McDonnell | B64D 11/00153 |
| | | | 244/118.5 |
| 9,056,683 B2* | 6/2015 | Cho | B64D 11/0636 |
| 9,132,198 B2 | 9/2015 | Kelley et al. | |
| 9,132,918 B2* | 9/2015 | Bamford | B64D 11/0643 |
| 9,650,145 B2 | 5/2017 | Lambert | |
| 10,693,409 B2 | 6/2020 | D'Angelo | |
| 10,787,262 B2 | 9/2020 | Ward | |
| 11,148,810 B2* | 10/2021 | Kigoshi | B64D 11/06 |
| 11,820,515 B2* | 11/2023 | Cope | B64D 11/0638 |
| 12,065,249 B2* | 8/2024 | Lee | B64D 11/0023 |
| 2004/0051003 A1 | 3/2004 | Cheung | |
| 2012/0200125 A1* | 8/2012 | Achilles | B64D 11/0641 |
| | | | 297/233 |
| 2013/0234486 A1* | 9/2013 | Duus | B60N 2/3065 |
| | | | 297/311 |
| 2019/0308732 A1 | 10/2019 | Croudace | |
| 2020/0331613 A1 | 10/2020 | Madrigal et al. | |

* cited by examiner

CONTIGUOUS PASSENGER SEAT ROWS CONFIGURED TO FORM A BED

RELATED APPLICATION AND INCORPORATION BY REFERENCE

This nonprovisional application claims the benefit of priority of India application No. 202341057927 filed Aug. 29, 2023, which is hereby incorporated by reference in its entirety.

TECHNICAL FIELD AND BACKGROUND

The present disclosure relates generally to provisions for sleeping in a passenger cabin such as an economy class cabin, and more particularly, to contiguous passenger seat rows including deployable elements configured to interact to form a bed.

Passenger cabins in airliners and other conveyances typically include separate economy and premium seating classes. Premium seating classes, where comfort is paramount, may include highly adjustable passenger seats configured to transition from an upright sitting position to a bed through various intermediate sitting positions. Economy seating classes, where density is paramount, may include integrated seat rows with limited backrest recline.

Most passengers are not able to assume a comfortable sleeping position in an economy class seat considering the steep angle of a reclined backrest, fixed position of the seat pan, lack of a leg rest, and close proximity to other passengers. As such, passengers not able to afford the cost of a premium class seat are at a sleeping disadvantage, particularly on long haul flights.

In some instances, a passenger cabin may be less than full. In such instances, it is possible to adjust seat assignments such that one passenger can make use of an entire row for sleeping. To further enhance sleeping comfort, it would be desirable if the entire seat row could be expanded to provide a larger bed surface area.

BRIEF SUMMARY

The present disclosure provides a provision for sleeping in a passenger cabin equipped with a plurality of contiguous passenger seat rows. In embodiments, a seat row positioned directly forward of another seat row includes deployable bed extensions. When the bed extensions of the forward seat row are deployed, a bed may be formed made up of the deployed bed extensions of the forward row plus the seat pans of the aft seat row to increase the bed surface area. In embodiments, each seat row includes at least two seats, and more preferably at least three seats, to provide a sufficient bed length. A bed conversion according to the present disclosure may be offered for sale at a premium when the passenger cabin is less than full.

In one aspect, embodiments of the inventive concepts disclosed herein are directed to a passenger seat arrangement configured to form a bed. In embodiments, the passenger seat arrangement includes a first row of passenger seats, each passenger seat within the first row including a seat pan, a backrest, a tray table deployable away from a backside of the backrest, and a bed extension deployable away from the backside of the backrest. The passenger seat arrangement further includes a second row of passenger seats contiguous with the first row of passenger seats, and each passenger seat within the second row includes a seat pan, a backrest, and at least one support deployable forward of the seat pan. In use, when the bed extension and the at least one support are deployed, the bed extension is substantially coplanar with the seat pan of one of the passenger seats in the second row and the at least one support engages the bed extension to support the deployed bed extension.

In some embodiments, the second row is positioned directly behind the first row, the number of passenger seats in the first row is equal to the number of passenger seats in the second row, and each passenger seat in the second row is longitudinally aligned with a passenger seat in the first row.

In some embodiments, the tray table is rotatably attached to a first pair of support arms, the bed extension is rotatably attached to a second pair of support arms, the bed extension is positioned below the tray table, and each of the tray table and the bed extension, when stowed, are positioned against the backrest, and when deployed, are oriented substantially horizontally.

In some embodiments, each support arm of the second pair of support arms includes an arcuate recess formed on an inboard side thereof, the bed extension includes a spring-loaded ball positioned on each outboard side thereof, and each spring-loaded ball is configured to travel along a respective one of the arcuate recesses during at least a portion of rotation of the bed extension.

In some embodiments, the seat pan of each passenger seat in the second row comprises a bifold cushion including a first cushion and a second cushion, and the second cushion, when the respective bed extension is deployed, is configured to be unfolded from against the first cushion and positioned atop the respective bed extension.

In some embodiments, the at least one support includes a pair of supports each rotatably attached to a frame member of the second row of passenger seats, and each support is configured to rotate between a first position under the seat pan and a second position extending forward of the seat pan.

In some embodiments, each support, when rotated to the second position and when the bed extension is deployed, is configured to be received in a recess formed in a bottom of the bed extension.

In some embodiments, the bed extension, when deployed, extends from the backrest to a front of the seat pan of the respective passenger seat in the second row.

In some embodiments, each of the first row and the second row includes three laterally adjacent passenger seats.

According to another aspect, the present disclosure provides an aircraft passenger seat row including three laterally adjacent passenger seats, each passenger seat including a seat pan, a backrest, a tray table deployable away from a backside of the backrest, and a bed extension deployable away from the backside of the backrest. In embodiments, the bed extension is positioned below the tray table, the tray table and the bed extension are each configured to rotate between a stowed positioned against the backrest and a deployed position residing in a substantially horizontal plane, and the bed extension, when deployed, is substantially coplanar with a seat pan in an aft positioned aircraft passenger seat row.

In some embodiments, the tray table is pivotally attached to a first pair of support arms, and the bed extension is pivotally attached to a second pair of support arms.

In some embodiments, each support arm of the second pair of support arms includes an arcuate recess formed on an inboard side thereof, the bed extension includes a spring-loaded ball positioned on each outboard side thereof, and each spring-loaded ball is configured to travel along a respective one of the arcuate recesses during at least a portion of rotation of the bed extension.

In some embodiments, the bed extension includes at least one recess formed on one side thereof configured to receive at least one support of an aft positioned second row configured to support the bed extension when deployed.

In some embodiments, the bed extension, when deployed, extends from the backrest to a front of a seat pan of passenger seat in an aft positioned aircraft passenger seat row.

According to yet another aspect, the present disclosure provides a seating arrangement including first and second contiguous passenger seat rows, with each of the first and second passenger seat rows comprising three laterally adjacent passenger seats. In embodiments, each passenger seat within each of the first and second passenger seat rows includes a seat pan, a backrest, a tray table rotatable between a stowed position against a back of the backrest and a deployed position residing in a first substantially horizontal plane, a bed extension rotatable between a stowed position against a back of the backrest and a deployed position residing in a second substantially horizontal plane, the second substantially horizontal plane positioned below the first substantially horizontal plane, and at least one support deployable forward of the seat pan, the at least one support configured to be deployed to support a deployed bed extension.

In some embodiments, the second row is positioned directly behind the first row, and each passenger seat in the second row is longitudinally aligned with a passenger seat in the first row.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to passenger seating arrangements including rows of passenger seats, wherein at least one row can be converted from a plurality of passenger seats to a single bed. In embodiments, bed extensions deploy from one row and cooperate with the seat pans of a contiguous row to form a bed. In embodiments, the bed extensions deploy from against the backrests of a forward row and rotate downward to reside substantially in the same plane as the seat pans of the aft row. In embodiments, supports deploy from the aft row to support the deployed bed extensions below to help carry the weight of a sleeping passenger. In embodiments, the formed bed extends the length of the seat row and between the backrests of the contiguous rows. In embodiments, each convertible seat row may be an integrated assembly including a plurality of laterally adjacent seats, for instance 2, 3, 4 . . . n number of seats. When configured as passenger seats, the seat row generally has the appearance of any other seat row to provide a uniform look throughout the cabin. The bed may be formed by deploying and supporting each bed extension independently, for example, working from the window to the aisle for convenience.

In use, when the passenger cabin is full and all or nearly all seats are sold, the seat row may be configured as passenger seats. When a number of seats in the passenger cabin are not sold, passenger seating assignments may be changed to make the convertible seat row available to a single passenger for purchase at a premium, and that passenger purchasing the seat row has the option to convert the seat row to a bed during flight. In some embodiments, several seat rows according to the present disclosure may be strategically positioned within the cabin to provide the ability to convert at least some of the seat rows to beds during flight. The convertible seat rows may be positioned at the front or rear of the cabin for more privacy for sleeping.

Figure 1:
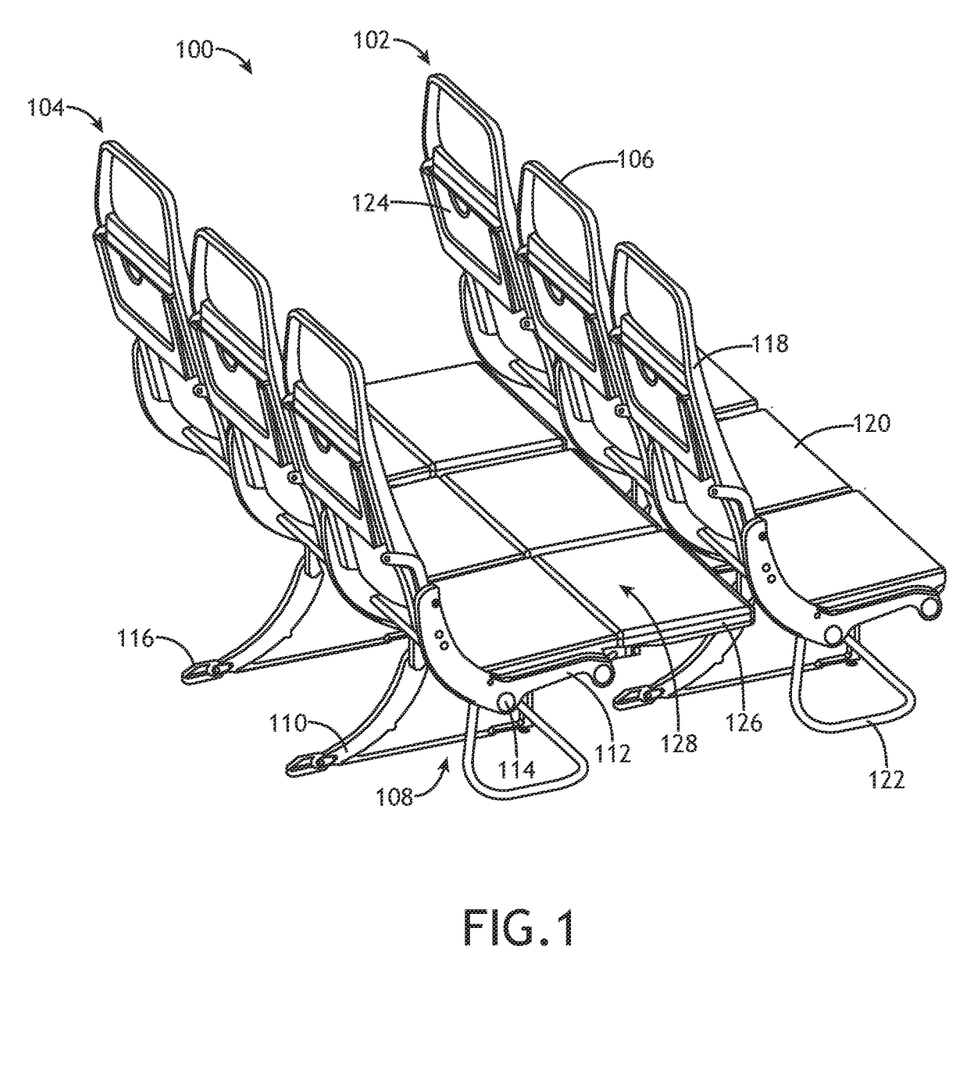
FIG. 1 is a perspective view of a passenger seating arrangement including seat rows shown converted to form a bed, in accordance with example embodiments of this disclosure.

FIG. 1 illustrates a passenger seating arrangement 100 for a passenger cabin, for instance an economy class passenger cabin in an aircraft. The passenger seating arrangement 100 generally includes two contiguous seat rows, referred to herein as a first or "forward" seat row 102, and a second or "aft" seat row 104. As used herein, the terms forward and aft refer to the positional relationship of the two seats rows and not necessarily their relationship to their installation environment and/or vehicle. For example, the two contiguous rows 102, 104 may be positioned forward facing or rear facing in an aircraft. The two rows 102, 104 may be longitudinally aligned such that each passenger seat 106 in one row is longitudinally aligned with a passenger seat in the other row.

Each seat row 102, 104 generally includes a frame assembly 108 supporting a number of laterally adjacent passenger seats 106, for instance two, three or four laterally adjacent passenger seats 104. As shown, each seat row 102, 104 includes three laterally adjacent seats 106 common in economy class seat rows and sufficient to form a comfortable bed length for a sleeping passenger. Each seat 106 within each seat row 102, 104 is independently convertible. In some embodiments, the first and second rows 102, 104 be alike such that the first row 102 can be used to form a bed in the second row 104, and the second row 104 can be used to form a bed with the row behind. In other embodiments, the first row 102 may be convertible while the second row 104 may lack bed extensions, as discussed further below. Thus, a cabin can be equipped with strategically positioned contiguous bed-forming rows in certain areas of the cabin.

In non-limiting embodiments, the frame assembly 108 of each seat row 102, 104 may include legs 110, spreaders 112, and transverse beams 114. Track fasteners 116 may be used to secure the legs 110 to seat tracks embedded in the floor. In embodiments, the frame assembly 108 includes spaced transverse beams 114 in the form of tubes wherein each transverse beam 114 is received through the legs 110 and the spreaders 112. In embodiments, the spreaders 112 may support rotational attachment of the backrest 118 and the transverse beams 114 support the attachment of the seat pan 120, wherein each passenger seat position includes a backrest 118 and a seat pan 120. Although not shown, the spreaders 112 may further support rotational attachment of armrests. In embodiments, the spreaders 112 may be positioned between adjacent seats 106 and at each end of the row 102, 104. In embodiments, the frame assembly 108 may further include a luggage retention bar 122.

Each seat 106 includes a tray table 124 configured to stow against its respective backrest 118 and deploy to a use position for dining, working, etc. When deployed, the tray table 124 may be substantially horizontal. Each passenger seat 106, or at least the passenger seats in the forward row 102, further includes a bed extension 126 deployable similar to the tray table 124. As discussed in detail below, when deployed as shown in FIG. 1, each deployed bed extension rotates downward to reside substantially coplanar and horizontally aligned with the seat pan 120 in the aft positioned row. Each seat pan 120 and bed extension 126 pairing forms a portion of the bed 128, for instance about a third of the bed surface area when the seat rows 102, 104 each include three laterally adjacent passenger seats.

Figure 2:
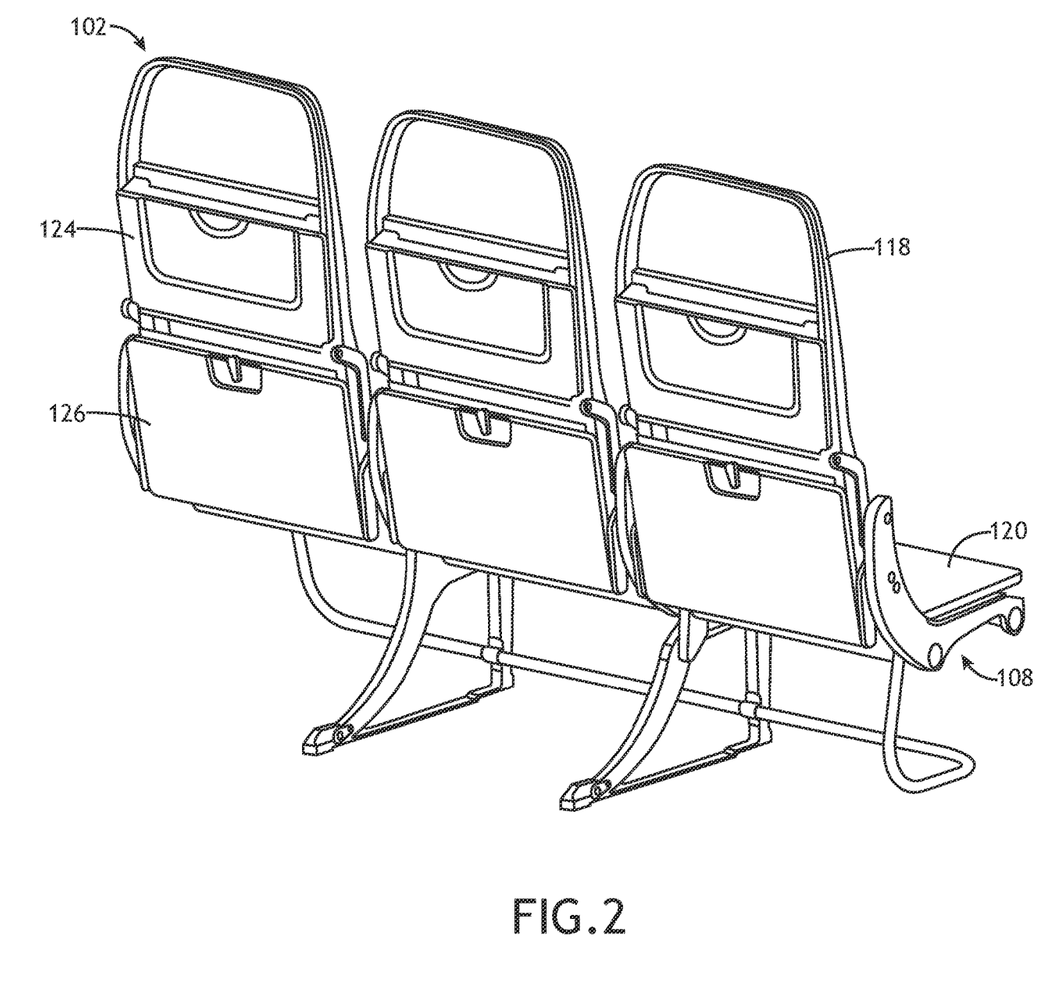
FIG. 2 is a perspective view of a passenger seat row including bed extensions shown in a stowed condition, in accordance with example embodiments of this disclosure.
Figure 3:
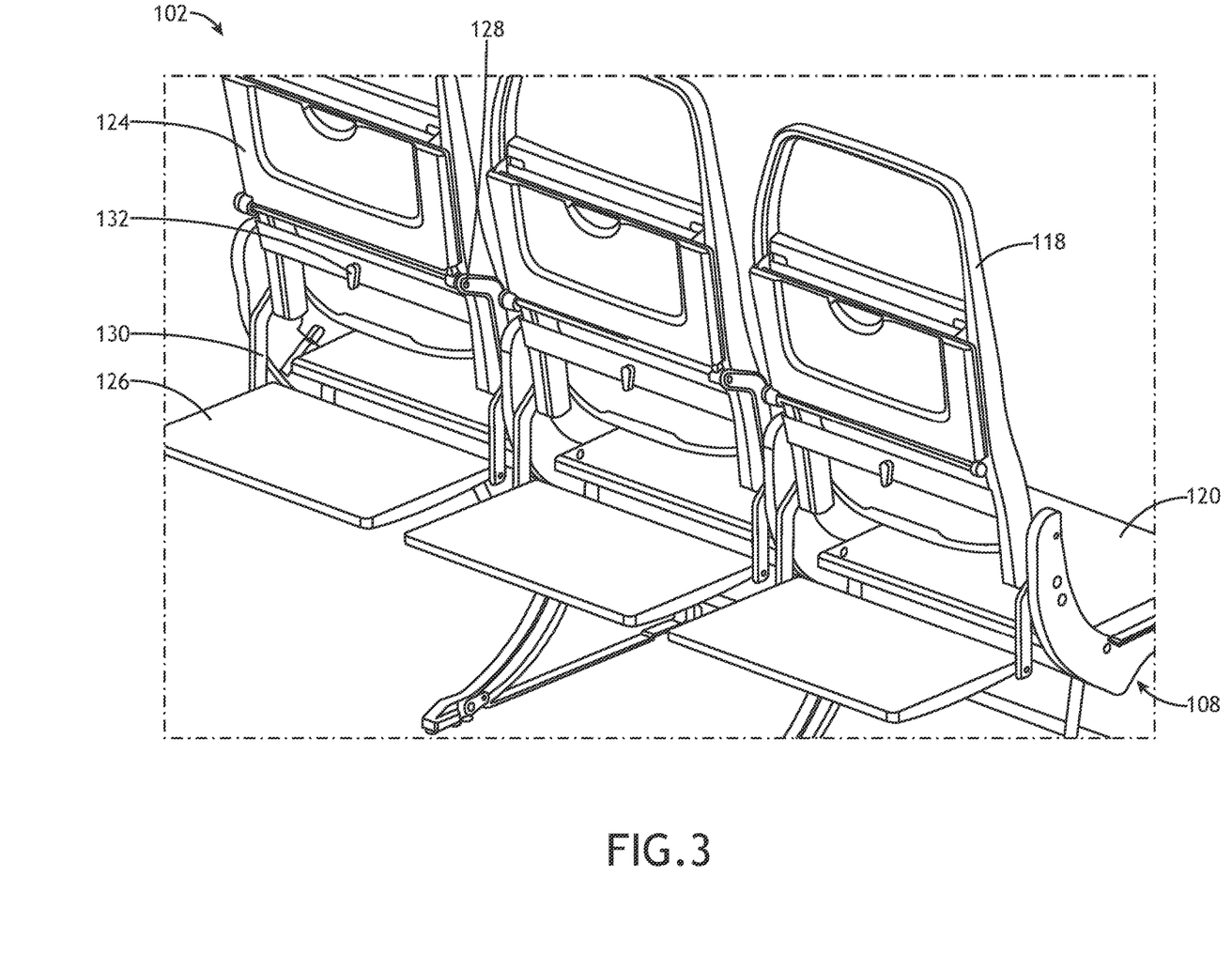
FIG. 3 is a perspective view of the passenger seat row of FIG. 2 showing the bed extensions in a deployed condition, in accordance with example embodiments of this disclosure.

FIGS. 2 and 3 illustrate the forward seat row 102, which in some instances may be the same as the aft seat row. In FIG. 2, the tray tables 124 and the bed extensions 126 are shown in their stowed condition against the backside of the backrest 118. Each may be held stowed or closed by way of a rotating latch commonly used in aircraft tray table constructions. The tray table 124 is positioned above the bed extension 126 such that, when deployed, the deployed tray table 124 is elevated above its respective seat pan. The bed extension 126 is positioned relative to the backrest 118 such that, when deployed as shown in FIG. 3, the bed extension 126 is substantially coplanar with the adjacent seat pan.

The tray table 124 may be rotatably attached to one end of a first pair of support arms 128 attached at their opposing end to the frame assembly 108. In use, the latch may be rotated to its release position thereby allowing the tray table 124 to rotate away from the backside of the backrest 118. The same may be true of the bed extension, wherein the bed extension 126 is rotatably attached to one end of a second pair of support arms 130 attached at their opposing end to the frame assembly 108, and in use a rotating latch 132 is rotated to its release position to allow the bed extension 126 to rotate away from the backside of the backrest 118. As shown, the first and second pairs of support arms 128, 130 may be oriented in substantially opposite directions, and each pair may or may not be rotatably attached to the frame assembly 108. Each pair of support arms 128, 130 may be provided in a symmetrical arrangement on opposite sides of its rotating component.

Figure 4:
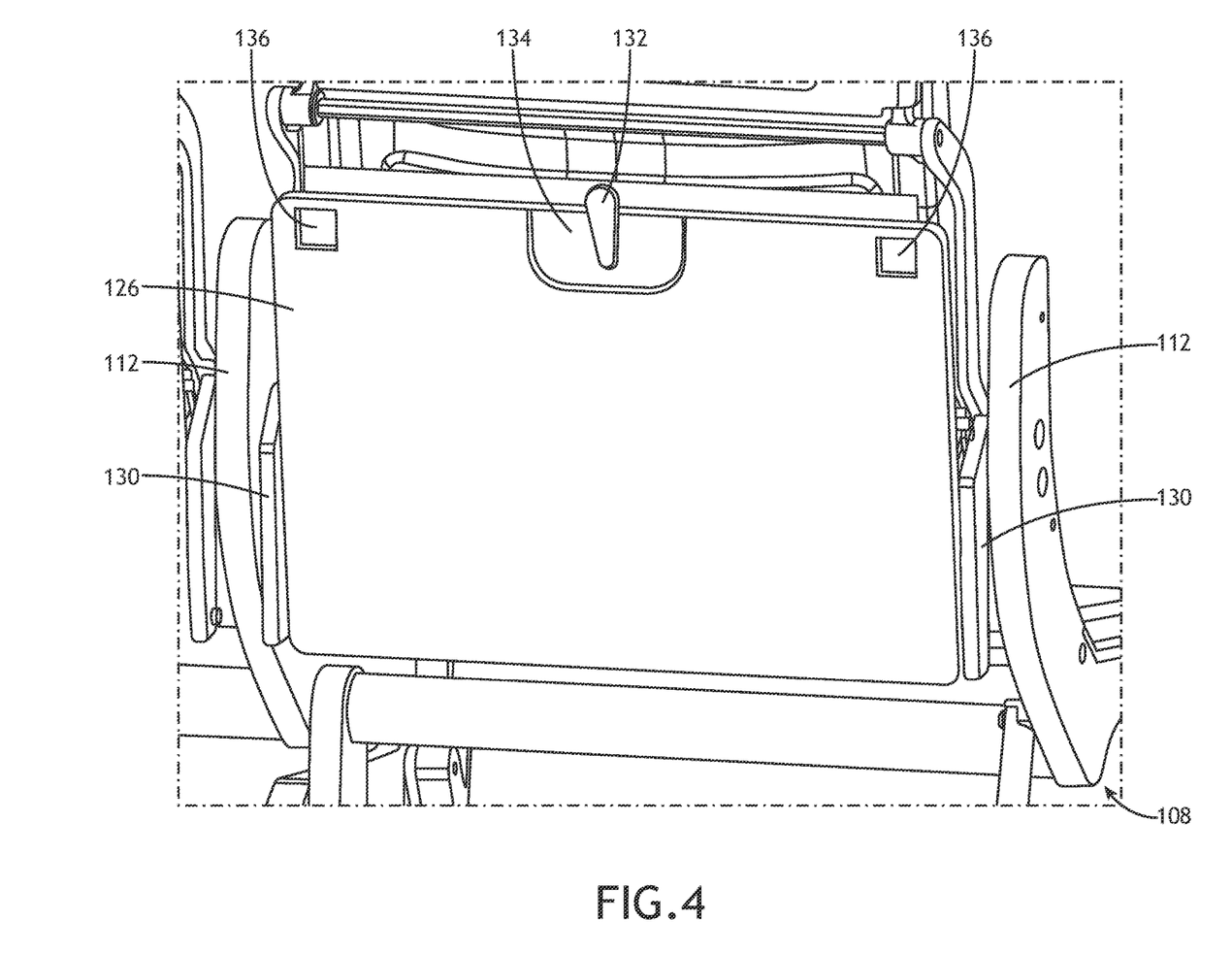
FIG. 4 is a detailed view of a portion of a passenger seat showing the bed extension in a stowed condition, in accordance with example embodiments of this disclosure.

FIG. 4 illustrates the bed extension 126 and its respective coupling to the frame assembly 108. As shown, each support arm 130 may be rotatably coupled at one end to one of the spreaders 112, and rotatably coupled at the opposing end to one side of the bed extension 126. The bed extension 126 has opposing faces wherein the face shown, which forms the bottom of the deployed bed extension, includes a first recess 134 for receiving the rotating latch 132 and a pair of spaced recess 136 for receiving a support feature for supporting the weight of bed extension and passenger.

Figure 5A:
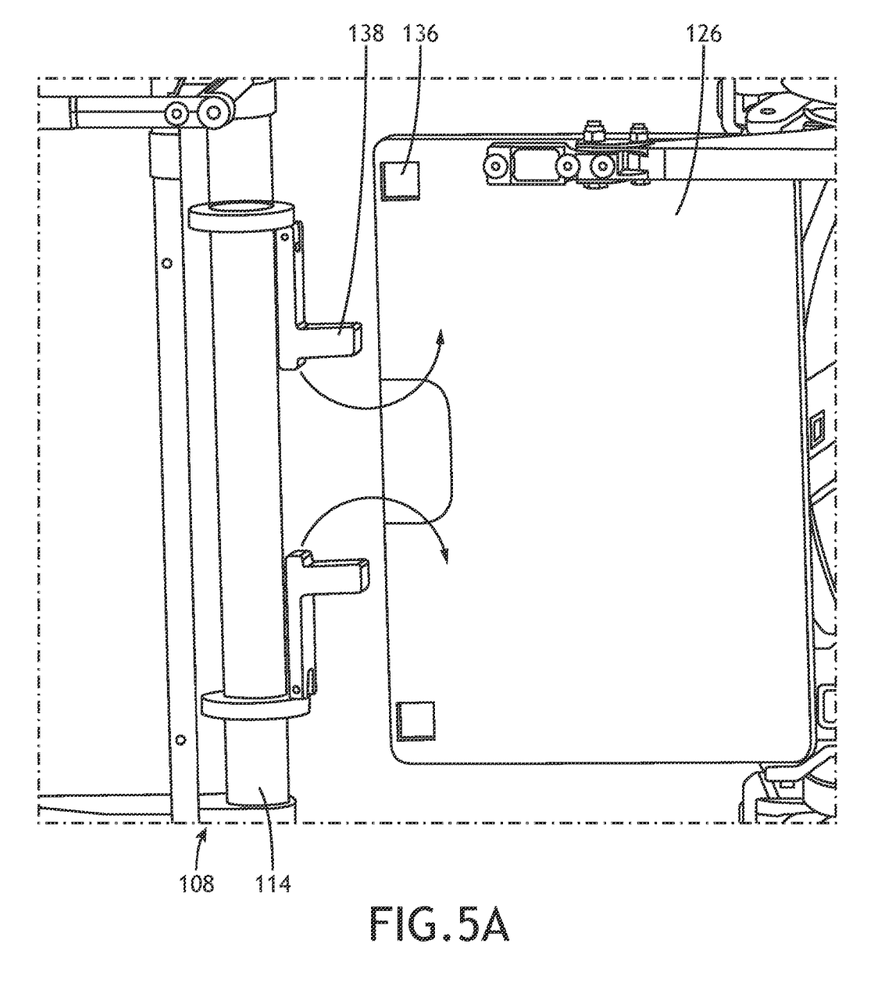
FIG. 5A is a detailed view of the underside of the deployed bed extension showing the bed extension supports in a stowed condition, in accordance with example embodiments of this disclosure.
Figure 5B:
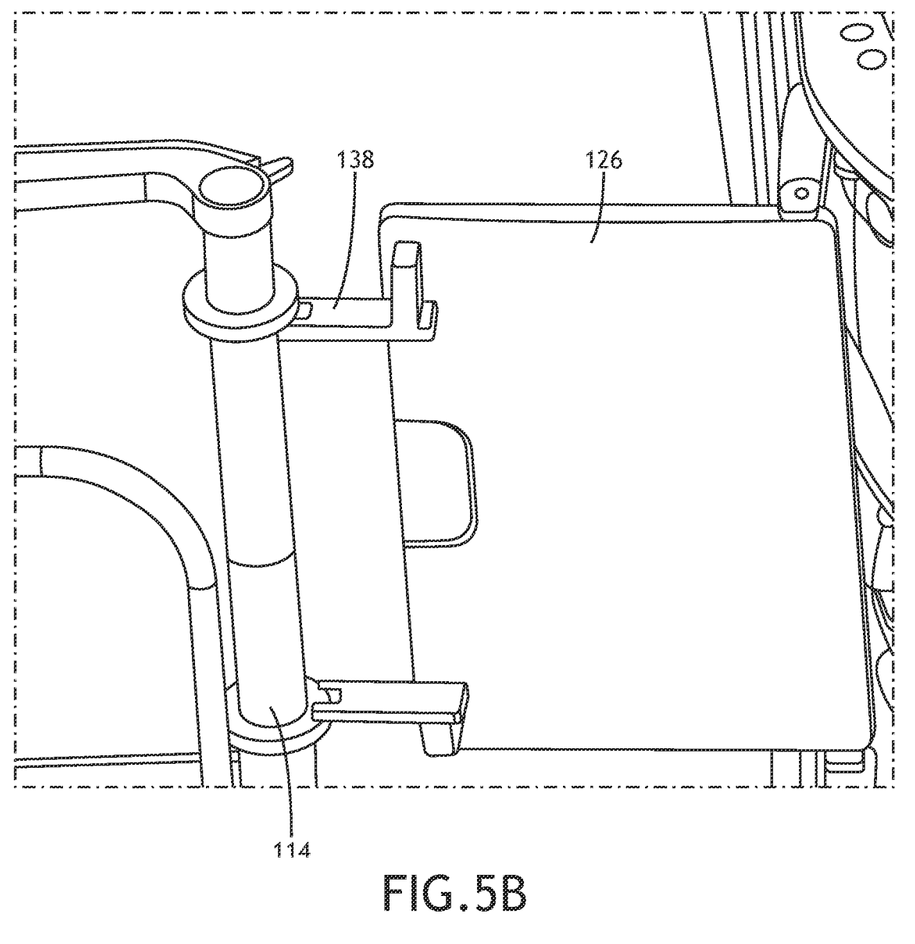
FIG. 5B is a detailed view of the underside of the deployed bed extension showing the bed extension supports in a deployed condition engaging the deployed bed extension, in accordance with example embodiments of this disclosure.

FIGS. 5A and 5B illustrate from below the interface between the deployed bed extension 126 and the respective bed extension supports. Referring to FIG. 5A, the frame assembly 108 may include at least one transverse beam tube 114. As shown, two separate supports 138 are each rotatably attached to the beam tube 114. In use, each support 138 is configured to rotate, independently, between a first position substantially parallel to the beam tube 114 and a second position substantially perpendicular to the beam tube 114. Each support 138 is therefore configured to rotate between a stowed position under the forward end of the seat pan and against the beam tube 114, and a deployed position in which at least a portion of the support 138 extends forward of the forward edge of the seat pan. As shown in FIG. 5B, in a non-limiting example, each support 138 may be L-shaped and the detached end of the support 138 is configured to be received in the corresponding recess 136 to maintain the support 138 and the bed extension 126 in engagement. As shown, the supports 138 may rotate in opposite directions for deployment and stowing.

Figure 6:
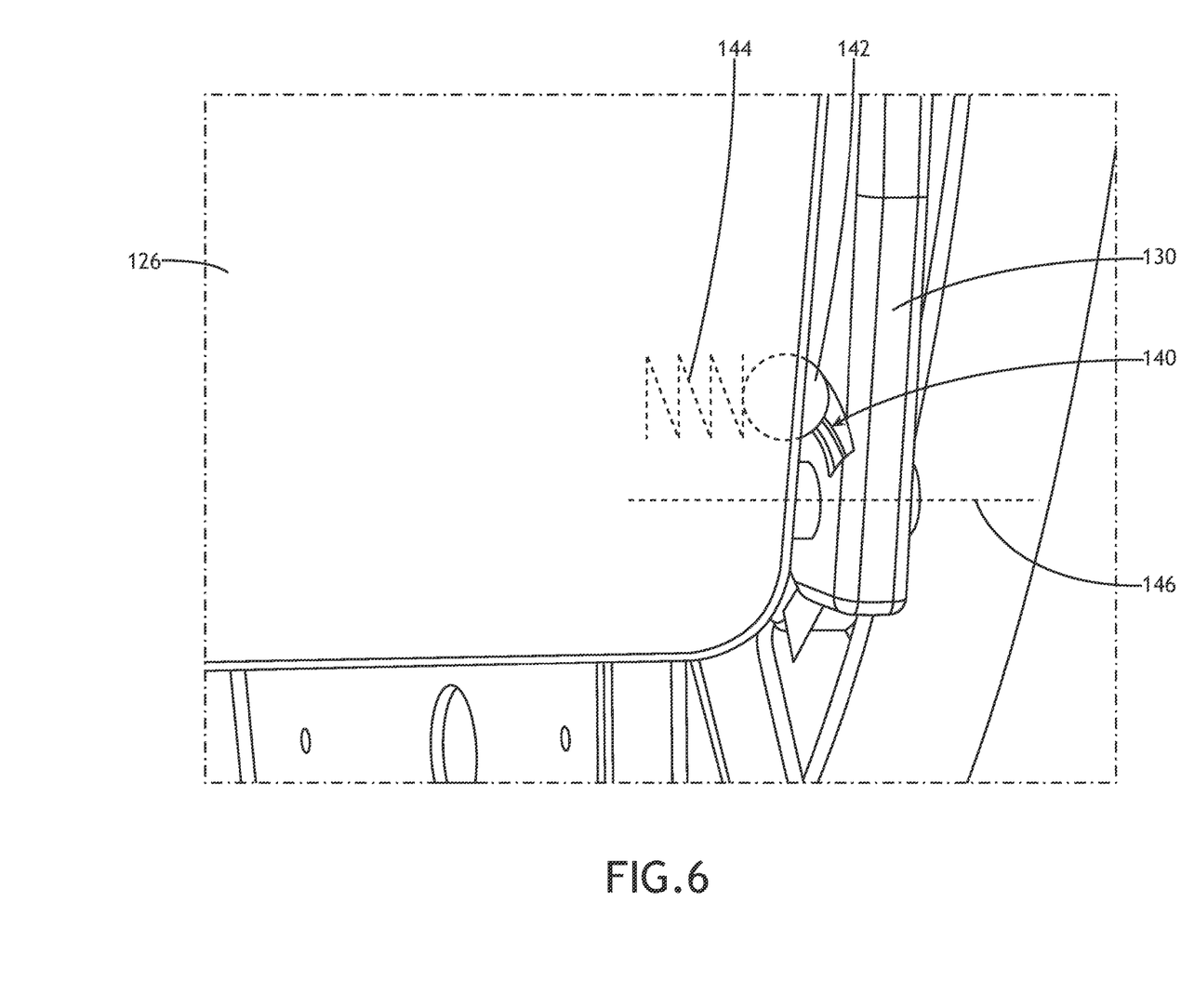
FIG. 6 is a detailed view of the interface between one side of the bed extension and its respective support arm, in accordance with example embodiments of this disclosure.

FIG. 6 illustrates an exemplary interface between the bed extension 126 and the support arms 130. Each support arm 130, of the symmetrical support arm arrangement, may include an arcuate recess 140 formed on an inboard side thereof. Each side of the bed extension 126 carries a recessed spring-loaded ball 142 that extends laterally outward. The arcuate recess 140 defines a travel pathway for the ball 142 for guiding and restraining a portion of the bed extension rotation, and in some embodiments limiting the maximum rotation. In use, to deploy the bed extension 126 when released from its respective latch, the top edge of the bed extension 126 may be pulled apart from the backrest. As the bed extension 126 rotates, the ball 142 travels along the arcuate recess until reaching a mechanical stop formed at one end of the recess. Force applied to the bed extension 126 from continued pulling causes the ball 142 to be driven inward into the bed extension 126 against the force of the spring 144, for instance a compression spring, thereby allowing the ball 142 to be rotated clear of the recess 140. The amount of rotation about the rotational axis 146 may be determined by the difference between horizontal and the angle of the bed extension 126 when stowed against the backrest.

Figure 7:
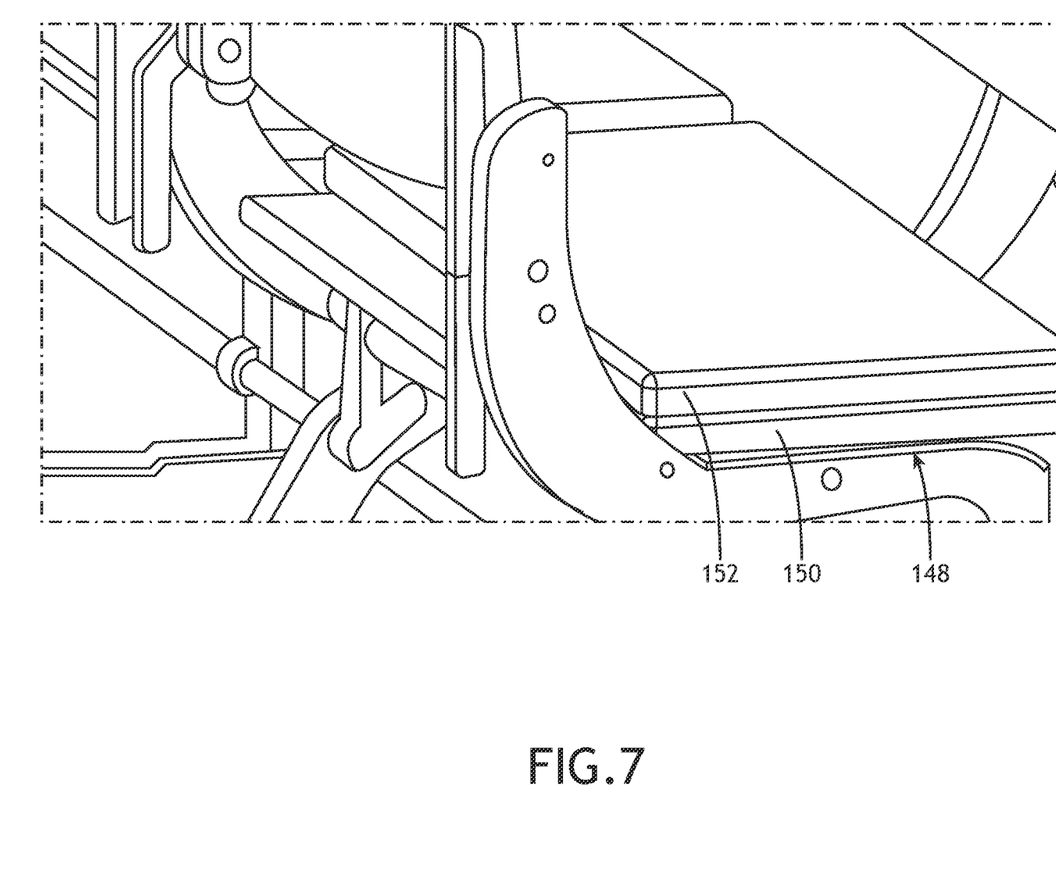
FIG. 7 is a perspective view of a bifold seat pan cushion shown in a folded condition, in accordance with example embodiments of this disclosure.

FIG. 7 illustrates a bifold cushion 148 including first and second cushion portions 150, 152. When the seat is configured for passenger seating as shown FIG. 7, the second cushion portion 152 is folded atop the first cushion portion 150 to form a seat cushion. When the seat is configured for passenger sleeping as shown in FIG. 1, the second cushion portion 152 is unfolded from against the first cushion portion 150 and positioned atop the deployed bed extension. The first and second cushion portions 150, 152 may be hinged together to prevent separation. When unfolded, the bifold cushion 148 may extend from the backrest of the seat in the first row to the backrest of the seat in the second row to cover the width of the bed.

Figure 8:
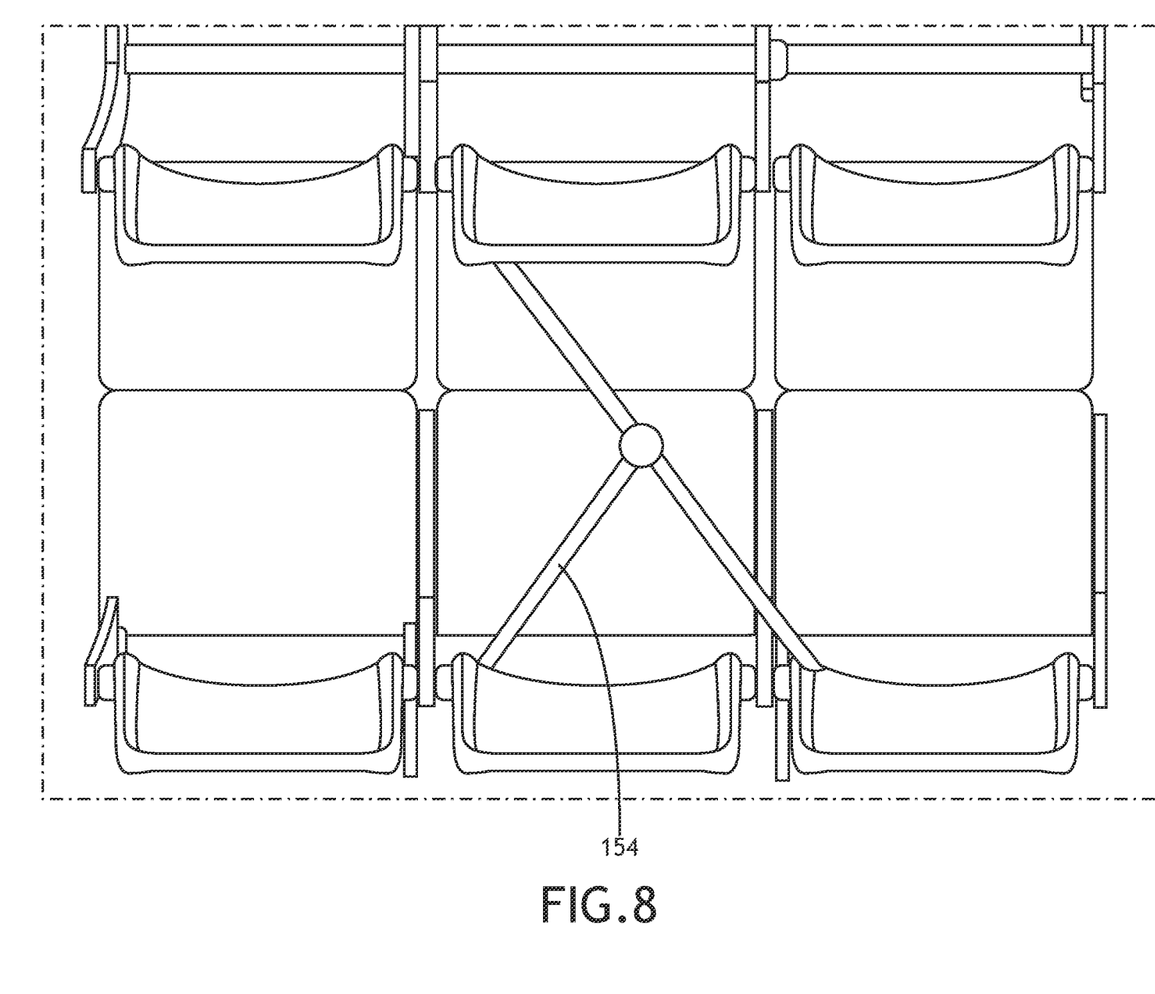
FIG. 8 is a top plan view showing the seat rows converted to form a bed and including a cross-body passenger restraint, in accordance with example embodiments of this disclosure.

FIG. 8 illustrates the complete bed conversion and a cross-body restraint passenger restraint 154 for use during bed mode. In embodiments, the passenger restraint 154 may utilize the middle seat restraint for positioning, and add an extension configured to anchor to the forward seat row or other forward structure. In use, the restrain extends across the width of the formed bed and may secure around the sleeping passenger about the waist.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger seat arrangement configured to form a bed, comprising:
   a first row of passenger seats, each passenger seat within the first row comprising:
   a seat pan;
   a backrest;
   a tray table deployable away from a backside of the backrest; and
   a bed extension deployable away from the backside of the backrest; and
   a second row of passenger seats contiguous with the first row of passenger seats, each passenger seat within the second row comprising:
   a seat pan;
   a backrest; and
   at least one support deployable forward of the seat pan;
   wherein, when the bed extension and the at least one support are deployed, the bed extension is substantially coplanar with the seat pan of one of the passenger seats in the second row and the at least one support engages the bed extension, and
   wherein the seat pan of each passenger seat in the second row comprises a bifold cushion including a first cushion and a second cushion, wherein the second cushion, when the respective bed extension is deployed, is configured to be unfolded from against the first cushion and positioned atop the respective bed extension.

2. The passenger seat arrangement according to claim 1, wherein:
   the second row is positioned directly behind the first row;
   a number of passenger seats in the first row is equal to a number of passenger seats in the second row; and
   each passenger seat in the second row is longitudinally aligned with a respective one of the passenger seats in the first row.

3. The passenger seat arrangement according to claim 1, wherein:
   the tray table is rotatably attached to a first pair of support arms;
   the bed extension is rotatably attached to a second pair of support arms;
   the bed extension is positioned below the tray table; and
   each of the tray table and the bed extension, when stowed, are positioned against the backrest, and when deployed, are oriented substantially horizontally.

4. The passenger seat arrangement according to claim 3, wherein:

each support arm of the second pair of support arms includes an arcuate recess formed on an inboard side thereof;

the bed extension includes a spring-loaded ball positioned on each outboard side thereof; and each spring-loaded ball is configured to travel along a respective one of the arcuate recesses during at least a portion of rotation of the bed extension.

5. The passenger seat arrangement according to claim 1, wherein the at least one support comprises a pair of supports each rotatably attached to a frame member of the second row of passenger seats, and each support is configured to rotate between a first position under the seat pan and a second position extending forward of the seat pan.

6. The passenger seat arrangement according to claim 5, wherein each support, when rotated to the second position and when the bed extension is deployed, is configured to be received in a recess formed in a bottom of the bed extension.

7. The passenger seat arrangement according to claim 1, wherein the bed extension, when deployed, extends from the backrest to a front of the seat pan of the respective passenger seat in the second row.

8. The passenger seat arrangement according to claim 1, wherein each of the first row and the second row includes three laterally adjacent passenger seats.

9. An aircraft passenger seat row, comprising:
three laterally adjacent passenger seats, each passenger seat comprising:
a seat pan;
a backrest;
a tray table deployable away from a backside of the backrest; and
a bed extension deployable away from the backside of the backrest;
wherein
the bed extension is positioned below the tray table;
the tray table and the bed extension are each configured to rotate between a stowed positioned against the backrest and a deployed position residing in a substantially horizontal plane;
the bed extension, when deployed, is substantially coplanar with a seat pan in an aft positioned aircraft passenger seat row;
the tray table is pivotally attached to a first pair of support arms and the bed extension is pivotally attached to a second pair of support arms;
each support arm of the second pair of support arms includes an arcuate recess formed on an inboard side thereof;
the bed extension includes a spring-loaded ball positioned on each outboard side thereof; and
each spring-loaded ball is configured to travel along a respective one of the arcuate recesses during at least a portion of rotation of the bed extension.

10. The aircraft passenger seat row according to claim 9, wherein the bed extension includes at least one recess formed on one side thereof configured to receive at least one support of the aft positioned aircraft passenger seat row configured to support the bed extension when deployed.

11. The aircraft passenger seat row according to claim 9, wherein the bed extension, when deployed, extends from the backrest to a front of a seat pan of passenger seat in the aft positioned aircraft passenger seat row.

12. A seating arrangement including first and second contiguous passenger seat rows, each of the first and second passenger seat rows comprising three laterally adjacent passenger seats, each passenger seat within each of the first and second passenger seat rows comprising:
a seat pan;
a backrest;
a tray table rotatable between a stowed position against a back of the backrest and a deployed position residing in a first substantially horizontal plane;
a bed extension rotatable between a stowed position against a back of the backrest and a deployed position residing in a second substantially horizontal plane, the second substantially horizontal plane positioned below the first substantially horizontal plane; and
at least one support deployable forward of the seat pan, the at least one support configured to be deployed to support a deployed one of the bed extensions;
wherein the seat pan carries a bifold cushion including a first cushion and a second cushion, the second cushion configured to unfolded from atop the first cushion and be positioned atop a deployed one of the bed extensions.

13. The seating arrangement according to claim 12, wherein:
the second row is positioned directly behind the first row; and
each passenger seat in the second row is longitudinally aligned with a respective one of the passenger seats in the first row.

14. The seating arrangement according to claim 12, wherein:
the tray table is rotatably attached to a first pair of support arms; and
the bed extension is rotatably attached to a second pair of support arms.

15. The seating arrangement according to claim 14, wherein:
each support arm of the second pair of support arms includes an arcuate recess formed on an inboard side thereof;
the bed extension includes a spring-loaded ball positioned on each outboard side thereof; and
each spring-loaded ball is configured to travel along a respective one of the arcuate recesses during at least a portion of rotation of the bed extension.

* * * * *